US009100101B2

(12) United States Patent
Chen (10) Patent No.: US 9,100,101 B2
(45) Date of Patent: Aug. 4, 2015

(54) POWER LINE COMMUNICATION DEVICE AND POWER CONTROL METHOD THEREOF

(71) Applicant: MediaTek Inc., Hsin-Chu (TW)

(72) Inventor: Kuo-Hsin Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 33 days.

(21) Appl. No.: 13/862,736

(22) Filed: Apr. 15, 2013

(65) Prior Publication Data
US 2014/0307812 A1    Oct. 16, 2014

(51) Int. Cl.
*H04L 25/00* (2006.01)
*H04B 3/00* (2006.01)
*H04B 3/54* (2006.01)

(52) U.S. Cl.
CPC ........................................ *H04B 3/54* (2013.01)

(58) Field of Classification Search
CPC .. H04B 3/54; H04B 2203/5495; H04B 3/542; H04B 3/46; H04B 3/56
USPC .................................. 375/258, 219–220, 257
See application file for complete search history.

(56) References Cited

U.S. PATENT DOCUMENTS

| 5,705,974 | A | * | 1/1998 | Patel et al. | 307/104 |
| 7,714,592 | B2 | * | 5/2010 | Radtke et al. | 324/629 |
| 8,620,236 | B2 | * | 12/2013 | Manssen et al. | 455/121 |
| 2004/0212481 | A1 | * | 10/2004 | Abraham | 340/310.01 |
| 2011/0058594 | A1 | | 3/2011 | Koyama et al. | |

* cited by examiner

*Primary Examiner* — Qutbuddin Ghulamali
(74) *Attorney, Agent, or Firm* — McClure, Qualey & Rodack, LLP (57) ABSTRACT

A power line communication device and a power control method thereof are provided. The power line communication device, coupled to a power line in a power line communication system, includes a transmitter, a power coupler, a signal detector and a controller. The transmitter is configured to produce a transmit signal. The power coupler, coupled to the transmitter, is configured to couple the transmit signal to the power line. The signal detector, coupled between the transmitter and the power coupler, is configured to detect the transmit signal. The controller, coupled to the transmitter and the signal detector, is configured to adapt a dynamic range of the transmitter based on the detected transmit signal without conducting a channel sounding procedure.

18 Claims, 7 Drawing Sheets

POWER LINE COMMUNICATION DEVICE AND POWER CONTROL METHOD THEREOF

BACKGROUND OF THE INVENTION

1. Field of the Invention

The present invention relates to power line communication, and in particular, a power line communication device and a power control method thereof.

2. Description of the Related Art

In recent years, high performance digital data transmission systems of power line communication systems have been developed. One of the issues faced by power line communication developers is the time-variant PLC channel characteristic, which is affected by electrical appliances attached to the power line.

BRIEF SUMMARY OF THE INVENTION

A detailed description is given in the following embodiments with reference to the accompanying drawings.

An embodiment of a power line communication device is described, coupled to a power line in a power line communication system, comprising a transmitter, a power coupler, a signal detector and a controller. The transmitter is configured to produce a transmit signal. The power coupler, coupled to the transmitter, is configured to couple the transmit signal to the power line. The signal detector, coupled between the transmitter and the power coupler, is configured to detect the transmit signal. The controller, coupled to the transmitter and the signal detector, is configured to adapt a dynamic range of the transmitter based on the detected transmit signal without conducting a channel sounding procedure.

Another embodiment of a power control method is provided, performed by a power line communication device, comprising: producing a transmit signal when coupled to a power line in a power line communication system; detecting the transmit signal; and adapting a dynamic range of the transmitter based on the detected transmit signal without conducting a channel sounding procedure.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
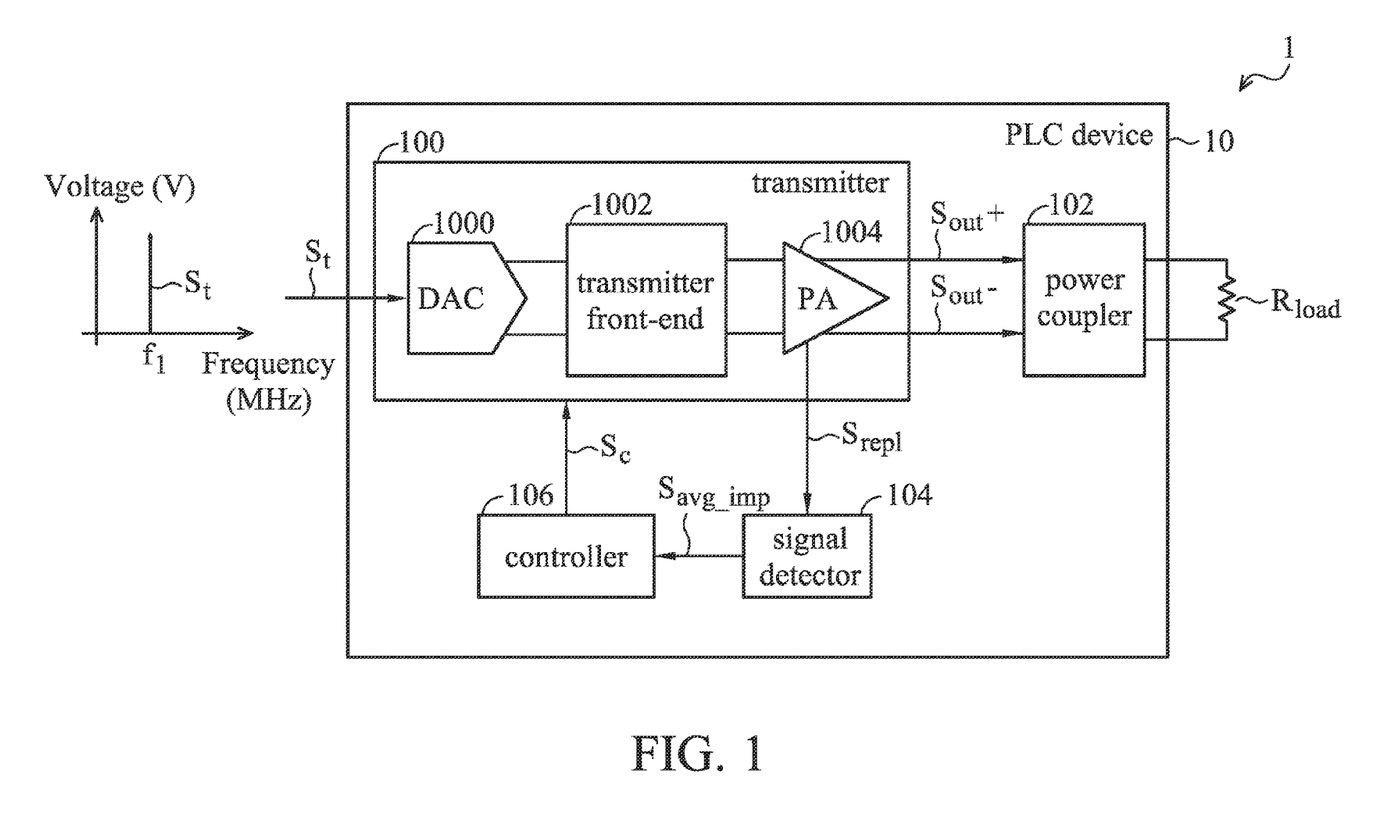
FIG. 1 is a block diagram of a Power Line Communication (PLC) device 10 capable of providing Dynamic Range Adaptation (DRA) according to an embodiment of the invention.

FIG. 1 shows a block diagram of a Power Line Communication (PLC) device 10 capable of providing Dynamic Range Adaptation (DRA) according to an embodiment of the invention. Power line communications systems operate by imposing a modulated carrier signal on a wired system. Different types of power line communications use different frequency bands, depending on the signal transmission characteristics of the power wiring used. FIG. 1 illustrates the PLC device 10 attached to a power line in a PLC system 1.

One characteristic of the PLC system is that channel impedance $R_{load}$ seen by the PLC device 10 may vary with the types and lengths of the power line and the types and numbers of electrical appliance connected to the power line, as well as operation frequencies of Transmit signals. For the PLC device 10 implemented by a voltage driver circuit, when the channel impedance $R_{load}$ falls below a certain level, the required current of the transmit signal driven by the PLC device 10 may surge high, or even be saturated due to the required current exceeding the maximal current $I_{max}$ that the PLC device 10 is able to drive, leading to hazardous overcurrent or over-temperature conditions. Therefore, to accommodate degradation or reduction of the channel impedance $R_{load}$, the PLC device 10 can adapt a dynamic range of a circuit gain in a transmit path without conducting a channel sounding procedure, which involves changing the modulation type, data rate or coding rate of a transmit signal delivered on the power line to restore the channel impedance $R_{load}$ to remain above or equal to the certain level. Specifically, when being attached to the power line, the PLC device 10 can closely monitor an impedance parameter such as a current level, a power level or an energy level of the transmit signal, to determine the occurrence of the degradation or the reduction of the channel impedance $R_{load}$, and accordingly, adapt the dynamic range of the amplitude of the transmit signal Sout± based on the estimated impedance parameter.

The PLC device 10 includes a transmitter 100, a power coupler 102, a signal detector 104, and a controller 106. The transmitter 100 is coupled to the power line via the power coupler 102. The signal detector 104 is coupled between the transmitter 100 and the power coupler 102, and is subsequently coupled to the controller 106.

The transmitter 100, including a Digital-to-Analog Converter (DAC) 1000, a transmitter front end 1002 and a line power amplifier (PA) 1004, is on the transmit path of the PLC device 10, performs digital signal processing at a baseband digital circuit (not shown), conversion at the DAC 1000, filtering at transmitter front end 1002, and amplification of a test signal St at the PA 1004, to produce the transmit signal to be transmitted on a power line.

The power coupler 102 may be a power transformer which couples the transmit signal from the transmitter 100 to the power line. When the transmitter 100 drives the transmit signal onto the power line, the load impedance $R_{load}$ of the power line, which depends on the carrier frequency of the transmit signal, as well as the other connected electronic devices, will impact on the performance of the transmitter 100 and the signal quality of the transmit signal. For example, when the load impedance $R_{load}$ is low, the transmitter 100 is required to output an increased current by a predetermined voltage. Further, the power coupler 102 can employ a turn ratio of 1:N to boost the voltage of the transmit signal on the power line, requiring a further N times of the current on the power line to be driven by the transmitter 100. As the transmitter 100 is required to drive a plurality of transmit signals across a radio spectrum concurrently and in the increased current, the total current driven by the transmitter 100 will be large, posing a challenge in designing a transmitter that provides the required total current and a heat dissipation solution for reducing or removing the heat produced by the increased total current. For examples, the turn ratio of the power coupler 102 is 1:3, with the primary winding directly connected to the PA 1004 and the secondary winding directly connected to the power line. When the load impedance $R_{load}$ of the power line is low, the peak current on the power line may exceed 750 mA, rendering a current exceeding 2.25 A drawn from the PA 1004.

Figure 7:
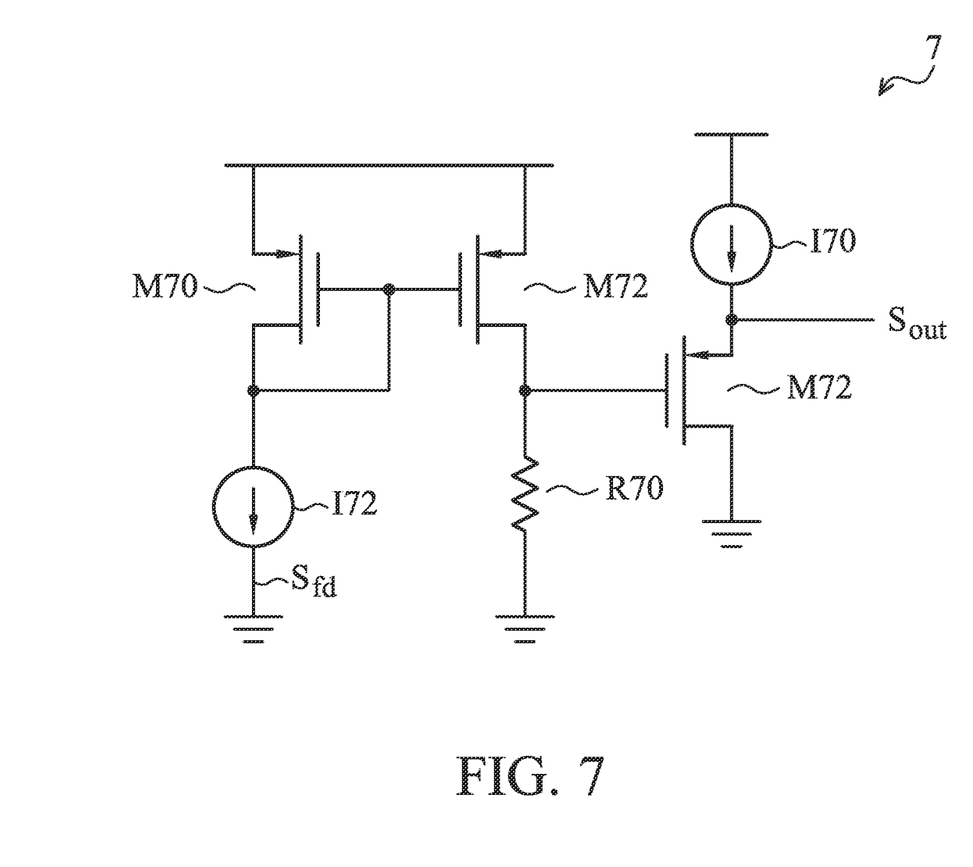
FIG. 7 is a circuit schematic of a current mirror circuit adopted by the PLC device 10 in FIG. 1

The signal detector 104 can estimate an impedance parameter that is indicative of the load impedance $R_{load}$ based on a replica signal $S_{repl}$ (detected transmit signal) of the transmit signal Sout±, and in turn, the controller 106 can adapt the circuit dynamic range on the transmit path based on the estimated impedance parameter without conducting a channel sounding procedure. The replica signal $S_{repl}$ is substantially identical to the transmit signal Sout±, reproduced by a current mirror such as one depicted in FIG. 7. The signal detector 104 may be implemented by the current mirror circuit 7, a current-to-voltage converter, a current integrator, a power detector, or an energy detector. The current of the replica signal $S_{repl}$ is inversely proportional to the load impedance $R_{load}$. The dynamic range is the ratio of the maximum signal power that the PLC device 10 can tolerate without distortion of the signal to the noise level, and can be adjusted by adapting a circuit gain of any circuit component in the transmitter 100, by adapting a power of the carrier signal that is multiplexed with the processed test signal St for producing the transmit signal Sout±, or by adjusting a quiescent current of the transmitter 100. That is, the controller 106 can generate a control signal Sc based on the impedance parameter for controlling the gain of a digital or an analog circuit including the baseband circuit, the DAC 1000, the transmitter front end 102 or the PA 1004, or for controlling the power of the carrier signal, thereby altering the dynamic range of the transmitter 100. For examples, the signal detector 104 can determine the peak current (impedance parameter) of the replica signal $S_{repl}$ exceeds 2.25 A, and adapt the dynamic range by decreasing circuit gain or the carrier power of the transmitter 100 accordingly, thereby keeping the current of the transmit signal Sout± within a safety level, e.g., 2 A. Accordingly, the adapted dynamic range decreases with an increase in the current of the replica signal $S_{repl}$.

When the PLC device 10 is attached to the power line during initialization, a sounding preamble is sent by the transmitter of the PLC device on the power line to determine the channel characteristics. In response, a receiver of the PLC device measures quality of the signals received on each tone to establish a tone map and reports the tone map to the transmitter. The tone map includes transmitter parameters of each subcarrier such as a modulation scheme, a transmit power, and coding rate for each subcarrier for pre-defined temporal window. The tone map is sent to the transmitter 100. The process of establishing the tone map is known as a sounding procedure. If the tone map is deemed to be invalid, for example, due to a high data error rate, the receiver may provide a new tone map to replace the existing tone map or redo the channel sounding procedure once again.

The test signal St may be a single tone signal generated by an internal circuit (not shown) of the PLC device 10 and fed into the transmitter 100. In response, the transmitter 100 can filter and process the single tone signal St to produce a differential transmit signal Sout± at a first frequency f1. To estimate the output impedance seem by the PLC device 10, the replica signal $S_{repl}$ of the transmit signal Sout± can be taken from the output of the power amplifier 1004 by the signal detector 104 to determine the first peak current of the replica signal $S_{repl}$. The peak current of the replica signal $S_{repl}$ may be different from that of the processed test signal St at output the DAC 1000 due to the effect of the load impedance $R_{load}$. The controller 106 is configured to receive the first peak current from the signal detector 104 and deduce an impedance level Z1 corresponding to the first transmit signal St at the first frequency f1. Further, the baseband signal may generate a second test signal and the PA 1004 is configured to drive a second transmit signal at a frequency f2, and in turn, the signal detector 104 is configured to determine the second peak current based on the replica signal $S_{repl}$ of the second transmit signal St, the controller 106 is configured to compute a second impedance Z2 corresponding to the second transmit signal. After N times repetitive process the impedances Z1 through ZN are collected and record by the controller 106. In most cases the number N of the impedances at different frequencies are different due to the nature of the power line.

Figure 3A:
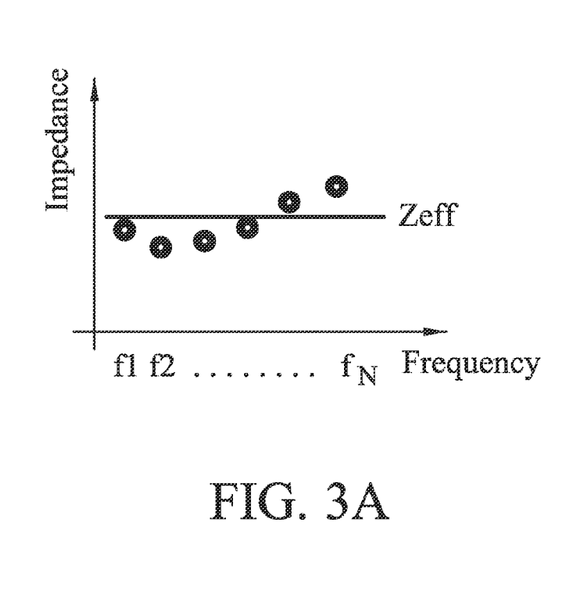
FIGS. 3A and 3B show impedances parameters adopted by the PLC device 10 according to an embodiment of the invention.
Figure 3B:
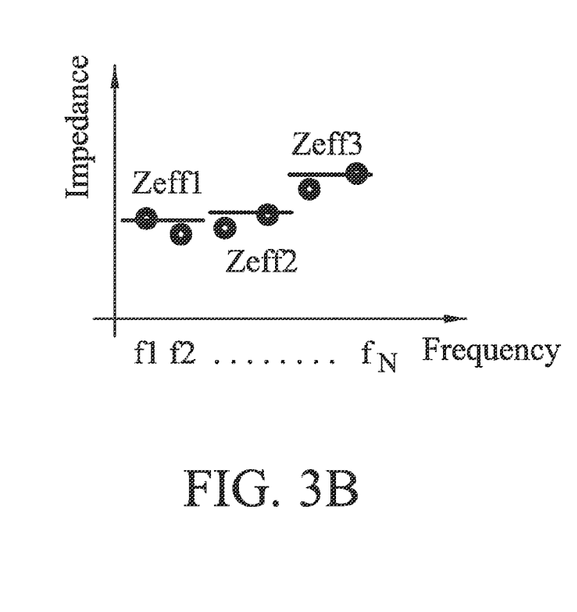

The impedance parameter can be acquired by averaging two or more impedances, as depicted in FIGS. 3A and 3B, showing the different groups of the averaged impedance Zeff, Zeff1, Zeff2 and Zeff3 as the impedances parameters adopted by the PLC device 10 according to an embodiment of the invention. The averaged impedance Zeff is the average of all collected impedances over the spectrum of interest. The averaged impedance Zeff1, Zeff2 and Zeff3 are the averages of impedances for each pair of adjacent frequencies. FIGS. 3A and 3B express the frequency dependent power line impedance for a single tone or a small set of single tones. If the variation of the power line impedance is small or the variation is smooth over the radio spectrum of interest, the single impedance or the averaged impedance parameter of the small set of single tones is representative to the PLC system and may be used for adapt the dynamic range of a circuit component in the transmitter 100, as indicated in the case of FIG. 3A. Otherwise, when the variation of the power line impedance is considerably large, a small numbers of adjacent frequencies, such as a pair of adjacent frequencies indicated in FIG. 3B, are averaged for adapting the dynamic range.

In contrast to the channel sounding procedure, the dynamic range adaptation procedure adopted by the PLC device 10 can adjust the dynamic range of any circuit component on the transmit path by the control signal Sc based on the impedance parameter of the power line. The PA 1004 is a voltage mode closed loop amplifier, the output current corresponds to an inverse of the load impedance. In order to keep the output current of the transmit signal Sout± under a predetermined current limit, the dynamic range of the DAC 100 may be decreased with the averaged impedance. By the dynamic range adaptation procedure, the output current to the power coupler 102 and the power line is limited to the predetermined current limit so that the PA 1004 can be protected from a hazardous condition such as an over-current condition or an over-temperature condition. Also the output power level, corresponding to the output current, will not be degraded due to the signal distortion during the over-current condition when the load impedance $R_{load}$ of the power line is small. Moreover, when the signal distortion of the transmit signal is decreased, the channel effective signal to noise ratio, the bit error rate and the average throughput rate of the transmit signal Sout± will be prevented from degradation.

The PLC device 10 estimates the impedance of the channels using a single tone test signal during the PLC communication, and adjusting the analog devices in a small scale by adaptively adjusting the dynamic range of the transmitter according to the estimated impedance without involving a channel sounding procedure, preventing the PLC device from driving excess current to the PLC system, while maintaining circuit performance without compromise.

Figure 2:
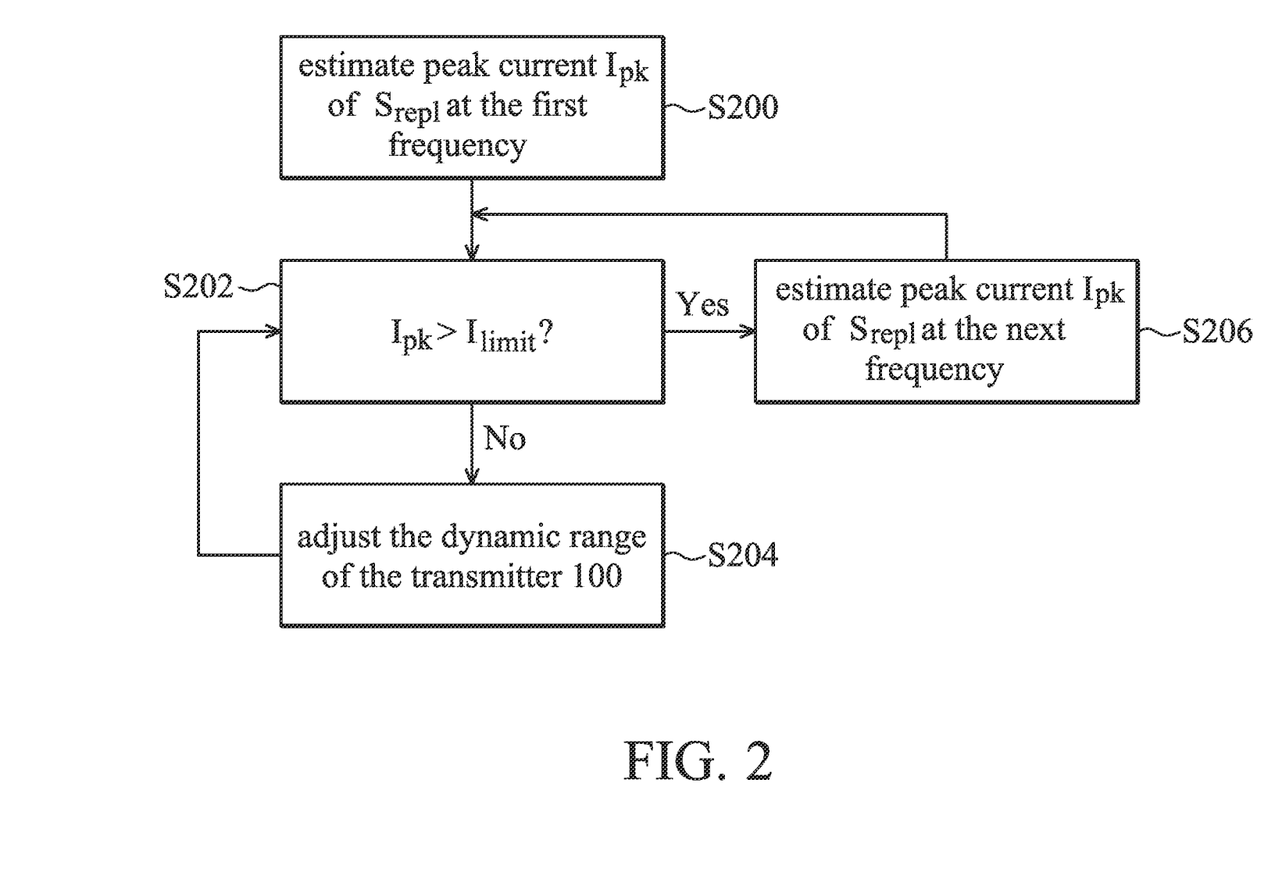
FIG. 2 is a flowchart of a power control method 2 of providing Dynamic Range Adaptation according to an embodiment of the invention.

In some embodiments, the PLC device 10 can perform the dynamic range adaptation upon detecting an over-current condition and the detected current may serve as the impedance parameter. FIG. 2 is a flowchart of a power control method 2 invoked by the over-current condition, according to an embodiment of the invention, incorporating the PLC device 10 in FIG. 1.

Upon startup, the PLC device 10 is initialized for the power control method 2. The PLC device 10 can send out the single tone transmit signal to estimate the impedance parameter for the first frequency f1 by the dynamic range adaptation procedure (S200). The signal detector 104 is configured to monitor and pass the current of the replica signal $S_{repl}$ of the transmit signal Sout± to the controller 106 for the dynamic range adaptation, since the transmit signal Sout± is affected by the load impedance $R_{load}$. The monitored current may be a peak current of the replica signal $S_{repl}$. The controller 106 is configured to determine whether the current of replica signal $S_{repl}$ exceeds a current threshold $I_{limit}$ (S202). If so, the over-current condition occurs, the controller 106 can adjust the dynamic range of the transmitter 100 according to the current of the replica signal $S_{repl}$ such that the current drawn by the PA 1004 is within the current threshold $I_{limit}$ (S206). If the replica signal $S_{repl}$ is equal to or less than the current threshold $I_{limit}$, the controller 106 can continue to estimate the impedance parameter for the next frequency and the power control method 2 loops back to Step S202 to detecting the over-current condition for the next frequency (S204).

Although the over-current condition is used to trigger the dynamic range adaptation, those who skilled in the art would recognize that other trigger mechanism such as an over-temperature condition may be employed in place of the over-current condition.

The power control method 2 provides a solution for a PLC device to perform the dynamic range adaptation for the transmitter when an over-current condition is detected, preventing the PLC device from driving excess current to the PLC system, maintaining circuit performance without compromise.

Figure 4:
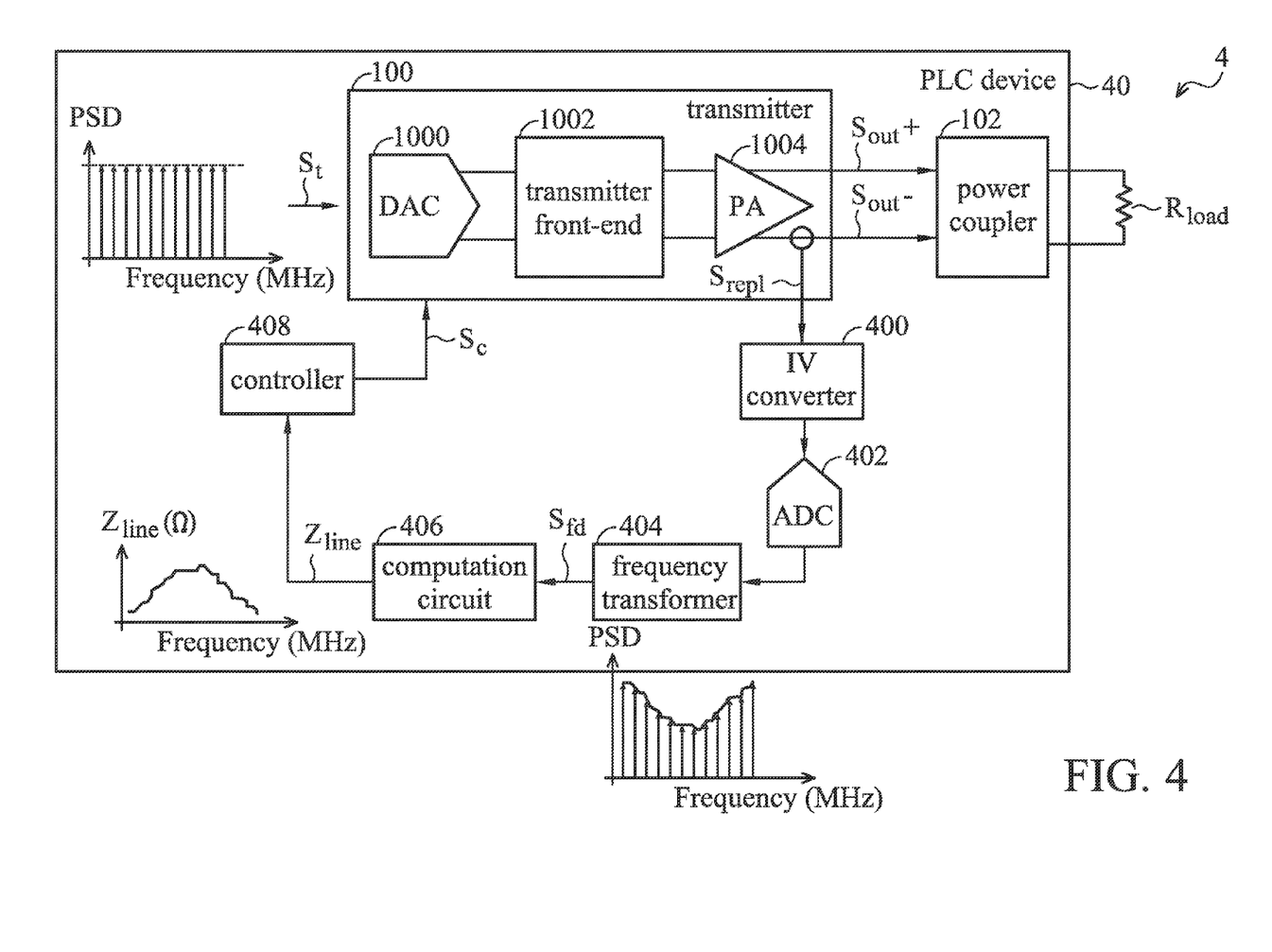
FIG. 4 is a block diagram of a PLC device 40 capable of providing Dynamic Range Adaptation according to another embodiment of the invention.

FIG. 4 is a block diagram of a PLC device 40 capable of providing Dynamic Range Adaptation according to another embodiment of the invention, comprising a transmitter 100, a power coupler 102, an IV converter 400, an ADC 402, a frequency transformer 404, a computation circuit 406 and a controller 408.

The PLC device 40 employs a frequency selective dynamic range adaptation, and is distinguished from the PLC device 10 at that instead of a single tone test signal, a discrete multitone signal Sout± is input into the transmit path by adopting a test signal Ts with N sinusoids having constant amplitude and phase and distributed uniformly over a radio spectrum of interest, e.g., between 0 and 30 MHz, known as a discrete multitone. The test signal Ts is plotted in the plane of frequency and power spectral density (PSD) for the band of interest. The replica signal $S_{repl}$ is transferred to the voltage domain by the IV converter 400 and goes through the ADC 402 for the digital conversion. The signal processing in the frequency transformer 404 interprets the replica signal $S_{repl}$ in the frequency domain to generate a frequency-domain signal $S_{fd}$ indicative of the PSD over the spectrum of interest. The frequency transformer 404 may be a Fast Fourier Transform (FFT) circuit. The computation circuit 406 is then configured to compare the frequency-domain signal $S_{fd}$ with the input test signal Ts to derive a map of the power line impedance. The impedance parameter adopted by the PLC 40 is an impedance line $Z_{line}$ over the spectrum of interest. The impedance estimation adopted by the PLC device 40 in FIG. 4 contains the impedance line $Z_{line}$ for the entire spectrum of interest, and has less information loss than the averaged impedance provided by the PLC device 10 in FIG. 1. The impedance line $Z_{line}$ is used by the controller 408 to adapt the dynamic range for each frequency separately by adjusting the power level of each carrier at each frequency according to the impedance line $Z_{line}$, so that none of the current components in the transmit signal Sout± can exceed the current threshold $I_{limit}$.

The PLC device 40 estimates the impedance of the channels using a discrete multitone signal during the PLC communication, and adaptively adjusts the dynamic range of the transmitter according to the estimated impedance, preventing the PLC device from driving excess current to the PLC system, while maintaining circuit performance without compromise.

Figure 5:
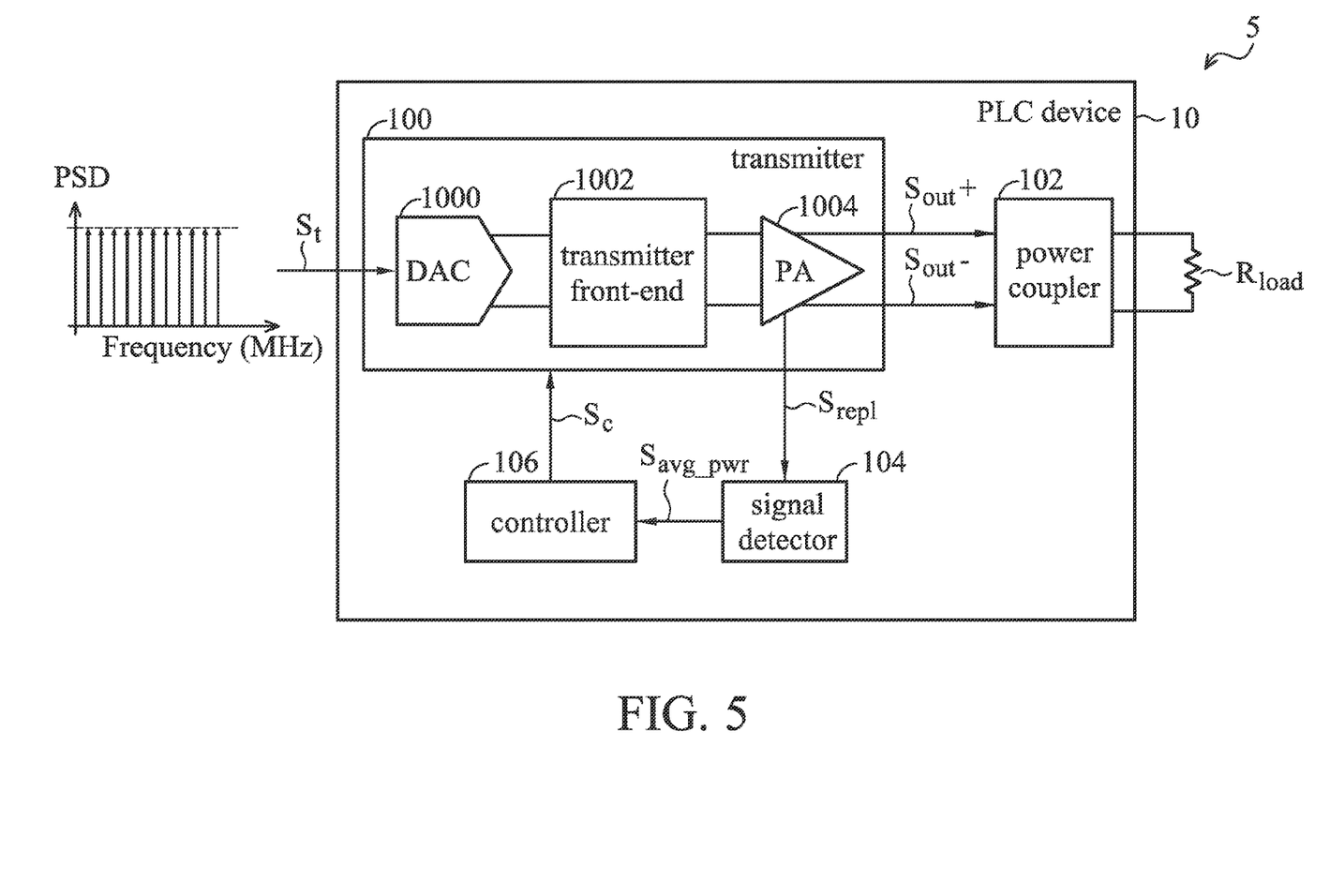
FIG. 5 is a block diagram of a PLC device 50 capable of providing Dynamic Range Adaptation according to yet another embodiment of the invention.

FIG. 5 is a block diagram of a PLC device 50 capable of providing Dynamic Range Adaptation according to yet another embodiment of the invention.

The PLC device 50 also utilizes the discrete multitone as the test signal St. The PLC device 50 is distinct from the PLC devices 10 and 40 at that instead of determining an impedance of the power line, the signal detector 104 simply collects and averages powers for all carriers in the replica signal $S_{repl}$. In turn, the controller 106 is configured to adapt the dynamic range of a circuit component on the transmit path by adapting the gain of the circuit component or by adapting the power level of the carrier signals according to the averaged power Savg_pwr. No frequency transformation such as a Fast Fourier Transform is required in the PLC device 50, decreasing the circuit complexity and reducing the circuit cost.

The PLC device 50 estimates the impedance of the channels by determining an averaged power of a transmit signal over a radio spectrum of operation, and adaptively adjusts the dynamic range of the transmitter according to the averaged power, preventing the PLC device from driving excess current to the PLC system, maintaining circuit performance without the need of the complex Fourier transform computation.

Figure 6:
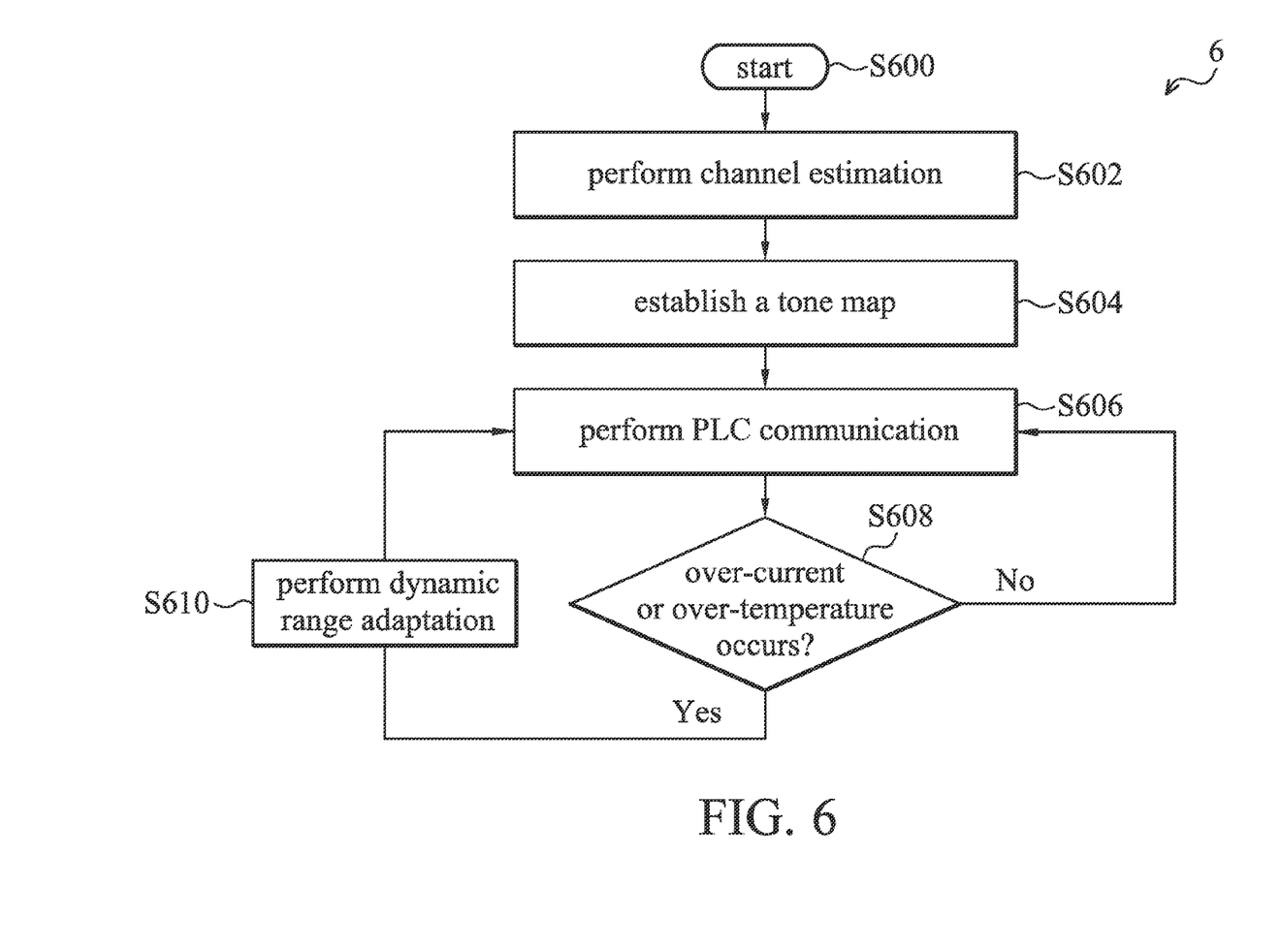
FIG. 6 is a flowchart of a power control method 6 according to another embodiment of the invention.

FIG. 6 is a flowchart of a power control method 6 according to another embodiment of the invention, incorporating the PLC device 10, the PLC device 40, or PLC device 50 in FIG. 1, FIG. 4, and FIG. 5 respectively.

Upon startup, the PLC device is initialized for the power control method 6. Next the PLC device performs channel estimation by the sounding procedure (S602) to establish a tone map (S604). The transmitter acquires the tone map to produce the transmit signal accordingly for the PLC communication (S606). The tone map includes information on the modulation scheme, the transmit power, and the coding rate for each subcarrier for pre-defined temporal window. During the PLC communication, the PLC device monitors the temperature or the output current continuously or regularly, to determine whether an abnormal condition such as the over-temperature condition or the over-current condition has occurred (S608). If not, the PLC device can return to step S606 to continue the PLC communication in Step S606. When the over-temperature condition or the over-current condition has occurred, the PLC device is required to perform the dynamic range adaptation procedure as detailed in FIGS. 1, 2, 4 and 5 without invoking the channel sounding procedure (S610) and return to Step S606 continuing the PLC communication.

The power control method 6 provides a solution for a PLC device to perform the dynamic range adaptation for the transmitter when an abnormal condition is detected, preventing the PLC device from driving excess current to the PLC system, maintaining circuit performance without compromise.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power line communication device, coupled to a power line in a power line communication system, comprising:
   a transmitter, configured to produce a transmit signal;
   a power coupler, coupled to the transmitter, configured to couple the transmit signal to the power line;
   a signal detector, coupled between the transmitter and power coupler, configured to detect the transmit signal; and
   a controller, coupled to the transmitter and the signal detector, configured to adapt a dynamic range of the transmitter based on the detected transmit signal without conducting a channel sounding procedure;
   wherein the transmitter is configured to consecutively produce two transmit signals at different frequencies;
   the signal detector is configured to determine two impedance parameters indicating impedances seen by the two transmit signals respectively; and
   the controller is configured to average the two impedance parameters, and adapt only the dynamic range of the transmitter based on the averaged impedance parameters.

2. The power line communication device of claim 1, further comprising a temperature sensor, coupled to the controller, configured to sense a temperature of the power line communication device;
   wherein the controller is configured to adapt the dynamic range of the transmitter when the sensed temperature exceeds a temperature threshold.

3. The power line communication device of claim 1, wherein:
   the signal detector is configured to determine a current of the transmit signal; and
   the controller is configured to adapt the dynamic range of the transmitter when the determined current exceeds a current threshold.

4. The power line communication device of claim 1, wherein the adapted dynamic range decreases with an increase in a current of the detected transmit signal.

5. The power line communication device of claim 1, wherein the transmit signal comprises a plurality of signal components distributed over a frequency spectrum.

6. The power line communication device of claim 1, further comprising:
   a frequency transformer, coupled between the signal detector and the controller, configured to transform the transmit signal from a time domain to a frequency domain; and
   a computation circuit, coupled between the frequency transformer and the controller, configured to determine a corresponding impedances seen by each signal component based on the transformed transmit signal;
   wherein the controller is configured to adapt the dynamic range of the transmitter by adapting a corresponding power level of a corresponding carrier for each signal component based on the corresponding impedance.

7. The power line communication device of claim 1, wherein:
   the signal detector is configured to determine a corresponding power of each signal component; and
   the controller is configured to average all corresponding powers of the plurality of signal components, and adapt the dynamic range of the transmitter based on the averaged corresponding power.

8. The power line communication device of claim 1, wherein the controller is configured to adapt the dynamic range of the transmitter by adapting a gain of the transmitter.

9. The power line communication device of claim 1, wherein the controller is configured to adapt the dynamic range of the transmitter by adapting a power of a carrier in the transmitter.

10. A power control method, performed by a power line communication device, comprising:
    producing a transmit signal when being coupled to a power line in a power line communication system;
    detecting the transmit signal; and
    adapting a dynamic range of the transmitter based on the detected transmit signal without conducting a channel sounding procedure;
    wherein the producing step comprises consecutively producing two transmit signals at different frequencies;
    the detecting step comprises determining two impedance parameters indicating impedances seen by the two transmit signals respectively; and
    the adapting step comprises averaging the two impedance parameters, and adapting the dynamic range of the transmitter based on the averaged impedance parameters.

11. The power control method of claim 10, further comprising:
    sensing a temperature of the power line communication device;

wherein the adapting step comprises adapting the dynamic range of the transmitter when the sensed temperature exceeds a temperature threshold.

12. The power control method of claim 10, wherein:
the detecting step comprises determining a current of the transmit signal; and
the adapting step comprises adapting the dynamic range of the transmitter when the determined current exceeds a current threshold.

13. The power control method of claim 10, wherein the adapted dynamic range decreases with an increase in a value of the detected transmit signal.

14. The power control method of claim 10, wherein the transmit signal comprises a plurality of signal components distributed over a frequency spectrum.

15. The power control method of claim 10, further comprising:
transforming the transmit signal from a time domain to a frequency domain; and
determining a corresponding impedances seen by each signal component based on the transformed transmit signal;
wherein the adapting step comprises adapting a corresponding power level of a corresponding carrier for each signal component based on the corresponding impedance.

16. The power control method of claim 10, wherein:
the detecting step comprises determining a corresponding power of each signal component; and
the adapting step comprises averaging all corresponding powers of the plurality of signal components, and adapting the dynamic range of the transmitter based on the averaged corresponding power.

17. The power control method of claim 10, wherein the adapting step comprises adapting a gain of the transmitter.

18. The power control method of claim 10, wherein the adapting step comprises adapting a power of a carrier in the transmitter.

* * * * *